United States Patent
Stefani et al.

(10) Patent No.: US 11,126,927 B2
(45) Date of Patent: Sep. 21, 2021

(54) AUTO-SCALING HOSTED MACHINE LEARNING MODELS FOR PRODUCTION INFERENCE

(71) Applicant: Amazon Technologies, Inc., Seattle, WA (US)

(72) Inventors: Stefano Stefani, Issaquah, WA (US); Steven Andrew Loeppky, Seattle, WA (US); Thomas Albert Faulhaber, Jr., Seattle, WA (US); Craig Wiley, Redmond, WA (US); Edo Liberty, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 934 days.

(21) Appl. No.: 15/822,061

(22) Filed: Nov. 24, 2017

(65) Prior Publication Data
US 2019/0164080 A1    May 30, 2019

(51) Int. Cl.
*G06N 3/02*    (2006.01)
*G06F 9/455*    (2018.01)
*G06N 20/00*    (2019.01)
*G06F 9/50*    (2006.01)
*G06Q 10/10*    (2012.01)
(Continued)

(52) U.S. Cl.
CPC ......... *G06N 20/00* (2019.01); *G06F 9/45558* (2013.01); *G06F 9/5072* (2013.01); *G06N 3/02* (2013.01); *G06F 2009/45595* (2013.01); *G06Q 10/10* (2013.01); *H04L 41/147* (2013.01);
(Continued)

(58) Field of Classification Search
CPC ...... G06N 20/00; G06N 3/02; G06F 9/45558; G06F 2009/45595; G06Q 10/10; H04L 41/147; H04L 43/08; H04L 61/2007; H04L 61/256
See application file for complete search history.

(56) References Cited

U.S. PATENT DOCUMENTS 8,175,863 B1 * 5/2012 Ostermeyer ........ G06F 11/3409
                                                                703/22
8,856,797 B1 * 10/2014 Siddiqui ................. G06F 11/34
                                                                718/104

(Continued)

FOREIGN PATENT DOCUMENTS

JP    2013-257892 A    12/2013
JP    2015-194958 A    11/2015
(Continued)

OTHER PUBLICATIONS

International Search Report and Written Opinion issued in related International Patent Application No. PCT/US2018/062041, dated Feb. 18, 2019, 12 pages.

(Continued)

*Primary Examiner* — Hal Schnee
(74) *Attorney, Agent, or Firm* — NDWE LLP

(57) ABSTRACT

Techniques for auto-scaling hosted machine learning models for production inference are described. A machine learning model can be deployed in a hosted environment such that the infrastructure supporting the machine learning model scales dynamically with demand so that performance is not impacted. The model can be auto-scaled using reactive techniques or predictive techniques.

20 Claims, 10 Drawing Sheets

(51) Int. Cl.
    *H04L 12/24*    (2006.01)
    *H04L 12/26*    (2006.01)
    *H04L 29/12*    (2006.01)
(52) U.S. Cl.
    CPC .......... *H04L 43/08* (2013.01); *H04L 61/2007* (2013.01); *H04L 61/256* (2013.01)

(56) References Cited

U.S. PATENT DOCUMENTS

| | | | |
|---|---|---|---|
| 9,471,775 B1* | 10/2016 | Wagner | H04L 63/20 |
| 2013/0346594 A1* | 12/2013 | Banerjee | G06F 11/3495 709/224 |
| 2015/0026348 A1 | 1/2015 | Siddiqui et al. | |
| 2015/0244645 A1* | 8/2015 | Lindo | H04L 43/0876 709/224 |
| 2016/0148115 A1 | 5/2016 | Sirosh et al. | |
| 2016/0164753 A1* | 6/2016 | Cimprich | H04L 41/082 709/222 |
| 2016/0232457 A1* | 8/2016 | Gray | G06T 11/206 |
| 2016/0323377 A1* | 11/2016 | Einkauf | H04L 67/1076 |
| 2018/0129524 A1* | 5/2018 | Bryant | G06F 11/301 |
| 2018/0139108 A1* | 5/2018 | Fulton | H04L 41/0631 |

FOREIGN PATENT DOCUMENTS

| | | |
|---|---|---|
| JP | 2016-058005 A | 4/2016 |
| JP | 2016-105281 A | 6/2016 |
| JP | 2017-117226 A | 6/2017 |
| JP | 2017-524183 A | 8/2017 |
| WO | 2016126731 A1 | 8/2016 |
| WO | 2016178951 A1 | 11/2016 |
| WO | 2017/168484 A1 | 10/2017 |

OTHER PUBLICATIONS

Communication pursuant to Article 94(3) EPC, EP App. No. 18815476.9, dated Sep. 24, 2020, 6 pages.
Examination Report No. 1, AU App. No. 2018370848, dated Nov. 4, 2020, 5 pages.
International Preliminary Report on Patentability, PCT App. No. PCT/US2018/062041, dated Jun. 4, 2020, 9 pages.
Annex to the communication dated May 7, 2021 for EP Application No. 18815476.
AWS, "Nikkei Cloud First", Oct. 2017-Nov. 20, 2017, No. 19, 9 pages of Original Document Only.
Notice of Reasons for Refusal, JP App. No. 2020-528103, dated Jul. 6, 2021, 10 pages (6 pages of English Translation and 4 pages of Original Document).
Yasuhiro et al., "Amazon Web Services company introduction guide book", First edition, Mynavi Publishing, Jan. 15, 2016, 6 pages of Original Document Only.

* cited by examiner

AUTO-SCALING HOSTED MACHINE LEARNING MODELS FOR PRODUCTION INFERENCE

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
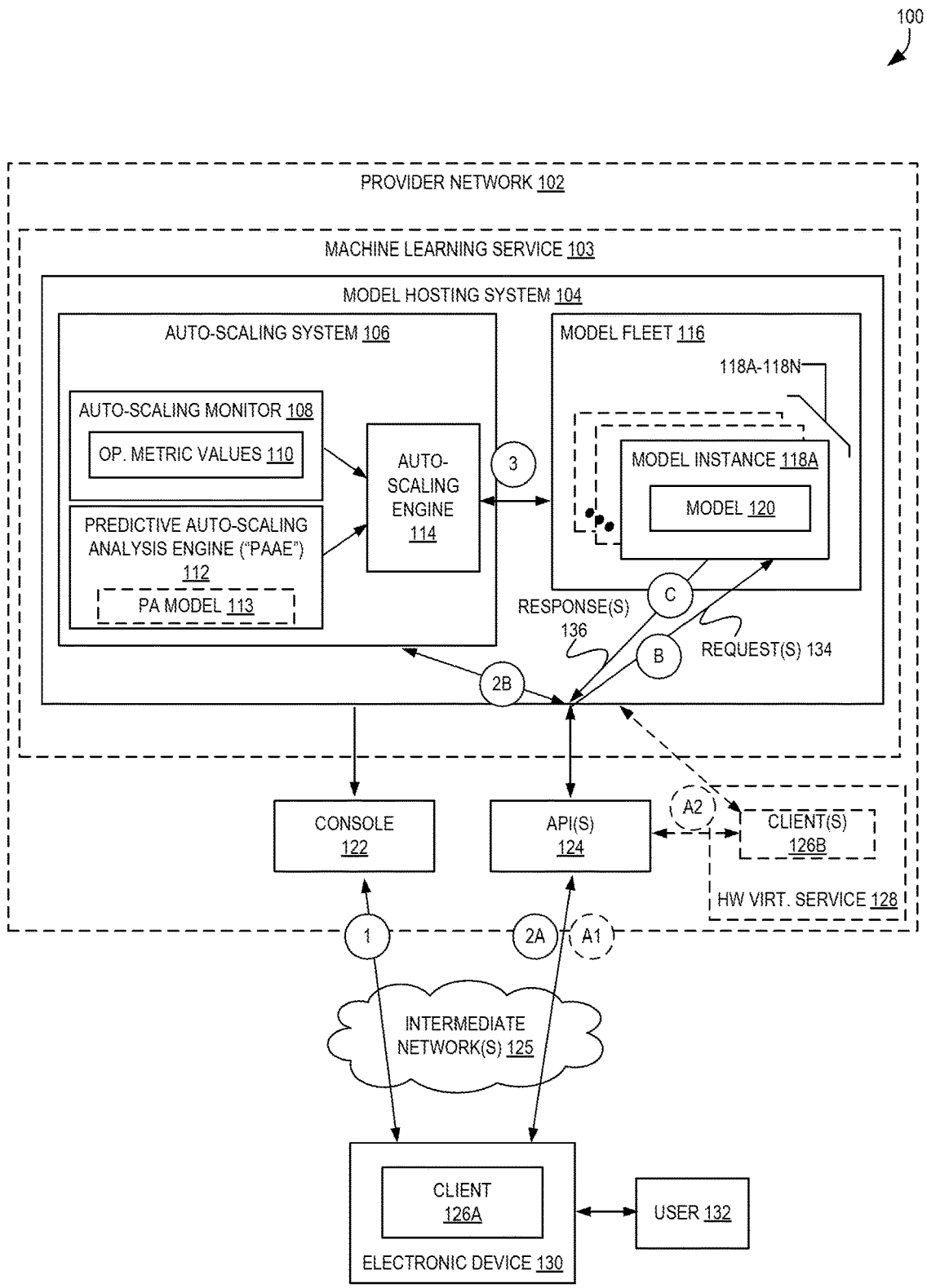
FIG. 1 is a block diagram illustrating an auto-scaling system for auto-scaling hosted machine learning models for production inference according to some embodiments.

Various embodiments of methods, apparatus, systems, and non-transitory computer-readable storage media for auto-scaling hosted machine learning models for production inference are described. According to some embodiments, machine learning models can be deployed in a hosted environment such that the infrastructure supporting the machine learning models scales dynamically with demand so that performance is not impacted.

Machine learning models can perform tasks ranging from classifying text or images, to performing regression, etc., and are commonly trained using a continuous or batch training process to result in a model. A model can be viewed as a function that can be input data points to result in an output. Models that operate on image data, for example, may output a class (e.g., whether there is a face or no face present in an image) or a value (e.g., an identifier of a person detected in an image). Models that operate on text, for example, may output similar types of output, such as a topic of conversation, a mood of the conversation, etc.

In some scenarios leveraging machine learning models, a user may have a set of data (or corpus) that the user desires to annotate, and the model can be run in batch using the set of data. Thus, an operating system process may be launched that applies the model (or function) to the whole set of data to generate annotations for the set of data, which the user may then use.

However, in many modern scenarios—such as the use of cloud services from provider networks—it has become very common for users to not have an initial test set of data to begin with, and these users do not want to wait to aggregate the data. Instead, upon obtaining a particular data point (e.g., an image, text, audio clip, etc.), the user may wish to send a request to an endpoint of a live service, which will immediately score/label the data point and return the result. This paradigm has become the predominant one, and thus "on-demand" or real-time machine learning model processing for individual tasks has become crucial in a variety of fields, including but not limited to Internet of Things (IoT) systems, smart speakers, image recognition applications, online advertising, etc.

However, with such real-time machine learning model services, the traffic for these services tends to be extremely "bursty" and have a huge variance. For example, the number of requests for a particular model may significantly increase or decrease—often suddenly—due to a particular cyclical event at a time of day or year, an application becoming popular or going viral, etc., which may result in huge surges in activity. Accordingly, a model that may typically execute a few times a minute or hour may suddenly need to be executed thousands or hundreds of thousands (or more) times a minute.

Thus, services need to be able to accommodate such surges and/or lulls in demand, while not wasting resources due to over-provisioning, etc., that would result in wasted electronic resources, increased energy, increased costs, etc. For example, while a large amount of computing resources can be reserved or provided for a model to accommodate large traffic spikes, it is not efficient to continue reserving the same amount of resources during lulls in traffic, e.g., such as at three o'clock in the morning when traffic may be low due to many users being asleep.

Accordingly, embodiments disclosed herein provide auto-scaling techniques for hosted machine learning models to ensure the scalability and stability of the model—even in very bursty or unpredictable environments—while avoiding the waste of over-provisioning of resources.

FIG. 1 is a block diagram illustrating an auto-scaling system 100 for auto-scaling hosted machine learning models for production inference according to some embodiments. As illustrated, an auto-scaling system 106 (e.g., software executed by one or more computing devices of a provider network 102) can "auto-scale" the resources of a fleet 116 of model instances 118A-118N that host a machine learning model 120 to dynamically match the amount of resources to host the model 120 with the demands put on the model, without degrading the performance of the model.

A provider network 102 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), machine learning training and/or hosting, etc. These and other computing resources may be provided as services, such as a hardware virtualization service 128 that can execute compute instances, a storage virtualization service that can store data objects, a machine learning service 103 that trains and/or hosts machine learning models, etc. The users 132 (or "customers") of provider networks 102 may utilize one or more user accounts that are associated with a customer account, though these terms may be used somewhat interchangeably depend ending upon the context of use. Users may interact with a provider network 102 using a client 126A application of an electronic device 130 to communicate across one or more intermediate networks 125 (e.g., the internet) via one or more interface(s), such as through use of application programming interface (API) 124 calls, via a console 122 implemented as a website or application, etc. The interface(s) may be part of, or serve as a front-end to, a control plane of the provider network 102 that includes "backend" services supporting and enabling the services that may be more directly offered to customers.

To provide these and other computing resource services, provider networks 102 may utilize virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user 132 may directly utilize a compute instance hosted by the service provider system to perform a variety of computing tasks (e.g., execute a client 126B), or may indirectly utilize a compute instance by submitting code to be executed by the service provider system, which in turn utilizes a compute instance to execute the code (typically without the user having any control of or knowledge of the underlying compute instance(s) involved).

In some embodiments, a provider network 102 includes a machine learning service 103 allowing users to train and/or host machine learning models 120. Models can be implemented in a variety of ways in various embodiments. As one example, a model 120 may be implemented by one or more model instances 118A-118N, in which a model instance 118A may comprise a virtual machine that executes a container including code/logic for the model 120. The container may or may not have been created by a user, and the code may be written in any number of programming languages. The container, in some embodiments, is created to conform to a specification of the machine learning service 103 that allows the machine learning service 103 to train and/or host the model 120 without the user needing to be involved in the setup and/or configuration of resources (e.g., servers, networking environments). For example, the container may need to respond to certain requests issued to it on a particular port, write particular data to particular file system or network locations, read particular types of data from particular file system or network locations, etc. However, in other embodiments, a model instance 118A may comprise a virtual machine that executes the model 120 without a container, a software application executing or implementing the model 120, or even a physical host device that executes the model 120 (e.g., without a virtual machine and/or container).

In some embodiments, a hosted model 120 (e.g., in a model hosting system 104) can be scaled to accommodate larger or smaller amounts of traffic using a fleet 116 of model instances 118A-118N. Thus, for example, clients 126A-126B may issue (at circle 'A1' and/or circle 'A2') requests 134 (at circle 'B') to the model 120, and these requests may visibly or transparently be processed by a model instance 118A of the fleet 116, which thus issues responses 136 (at circle 'C') back to the calling client. Accordingly, when a fleet 116 has more model instances 118A-118N—which can be homogeneous or heterogeneous in terms of resources—the fleet 116 typically can process more requests 134 over an amount of time than a single model instance 118A or a subset of the fleet 116.

The numbers and/or types of model instances 118A-118N of a fleet 116, in some embodiments, is managed by an auto-scaling system 106. The auto-scaling system 106 can use one or more of a variety of techniques for managing a model fleet 116 to provide optimal performance for the model 120.

Figure 3:
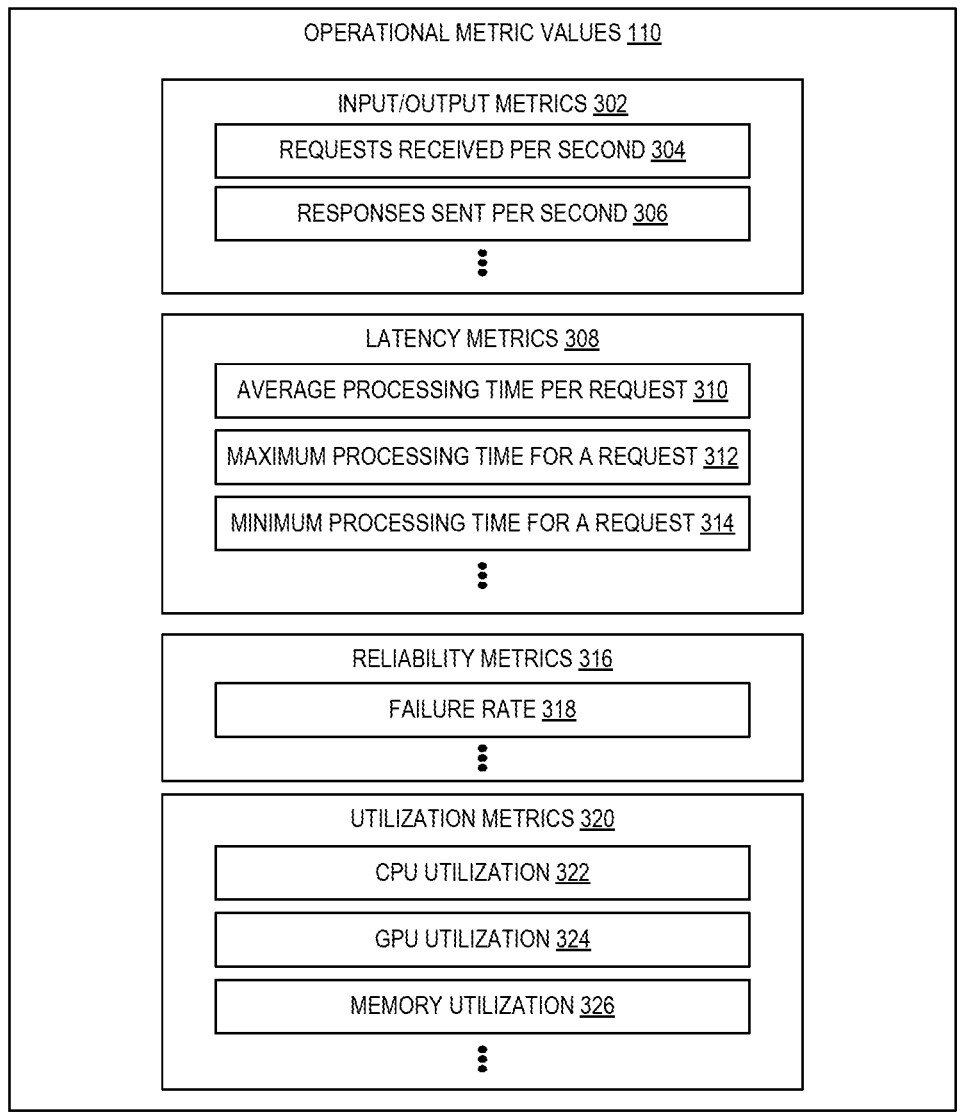
FIG. 3 is a diagram illustrating exemplary operational metric values that can be utilized as part of auto-scaling hosted machine learning models for production inference according to some embodiments.

For example, in some embodiments the auto-scaling system 106 includes an auto-scaling monitor 108 that can trigger an auto-scaling—e.g., an addition and/or removal of model instances from a fleet 116 by an auto-scaling engine 114—based on monitoring (or obtaining) operational metric values 110 associated with operating conditions of the fleet. The auto-scaling monitor 108 may obtain these metric values by direct observation/querying of the fleet, interacting with a logging service, receiving report data from the fleet, etc. Exemplary metric values 110 that can be utilized as part of auto-scaling hosted machine learning models are shown in FIG. 3. In this figure, a variety of operational metric values 110 are shown that can be monitored and potentially be used to determine whether the current fleet 116 of model instances 118A-118N serving a model 120 is over- or under-provisioned and thus, whether to add or remove capacity from the fleet. For example, monitored operational metric values 110 may include but not be limited to input/output metrics 302 (e.g., a number of requests arriving to be processed by the model 304, a number of responses being generated from the model 306), latency metrics 308 (e.g., a time to process requests, such as an average processing time per request 310, maximum processing time for a request 312, minimum processing time for a request 314), reliability metrics 316 (e.g., indicating whether requests are actually being served, such as a failure rate 318), utilization metrics 320 (e.g., how busy is the central processing unit (CPU) or "CPU utilization" 322, how busy is the graphics processing unit (GPU) or "GPU utilization" 324, what is the current or recent memory usage 326, etc.) of the virtual machine and/or underlying host device.

Notably, the different types of operational metrics can detect different types of conditions, which may be handled in different ways. As one example, different applications of the model may not necessarily have a same "weight" each time. For example, a video segmentation or annotation model may, for a first request, operate upon a ten-second video clip while a second request may involve a thirty-minute video clip, and each clip may be processed by the model in very different ways and require different amounts of execution time or other resources (e.g., GPU time, memory, etc.). Accordingly, using operational metrics such as latency metrics 308 or other metric values, embodiments can monitor the system to scale models correctly based on potentially different types of requests.

In some embodiments, the auto-scaling monitor 108 can obtain one or more of these operational metric values 110 and analyze them to characterize the workload for the model 120 to determine whether the fleet is over- or under-provisioned. With this result, the auto-scaling monitor 108 can determine whether to add or remove machines from the fleet, and send requests (e.g., API requests, function calls, etc.) to an auto-scaling engine 114 to perform scaling. The auto-scaling engine 114 can perform the scaling using a variety of different type of techniques that may be crafted specific to the particular implementation which are known or readily derivable by those of skill in the art.

In some embodiments, API calls may be made by the auto-scaling monitor 108 and/or predictive auto-scaling analysis engine 112 (described later herein), and in some embodiments similar API calls may be made by clients 126A-126 via API 124 (e.g., to directly manage a size of a fleet of model instances 118). As an example, an API call with a name such as "Update Machine Learning Model Capacity" could be used, which could include arguments such as a unique identifier of the model and/or fleet, a number of machines to be added or removed, etc.

The monitoring of operational metric values 110, and the determination regarding whether to perform an auto-scaling of a fleet 116, can be configured by a user 132 that deployed the model 120 in the model hosting system 104. For example, turning ahead to FIG. 4, a user interface 402A providing a metric value chart 404 and a user interface 402B for configuring the auto-scaling of a hosted machine learning model are illustrated. One or both of these user interfaces 402A-402B may be provided by a console 122 of the provider network 102, which could comprise a web server that powers a web application or O/S specific application used by a user 132.

In some embodiments, the console 122 provides a user interface 402B allowing the user to enable or disable "reactive" auto-scaling (e.g., via a user interface input element such as a checkbox, button, etc.). The user interface 402B may also provide functionality enabling the user to specify one or more metric conditions 450. As illustrated, two types of metric conditions 450 are utilized—ones that cause a "scaling up" of additional fleet resources, and ones that cause a "scaling down" of fleet resources. However, other embodiments may simply allow user-configurable "scale up" type metric conditions, and instead the auto-scaling monitor 108 may perform "scaling down" determinations on its own accord. The reverse may also be true in some embodiments; and thus, a user may specify "scale down" conditions while the auto-scaling monitor 108 implements "scale up" determinations on its own.

Figure 4:
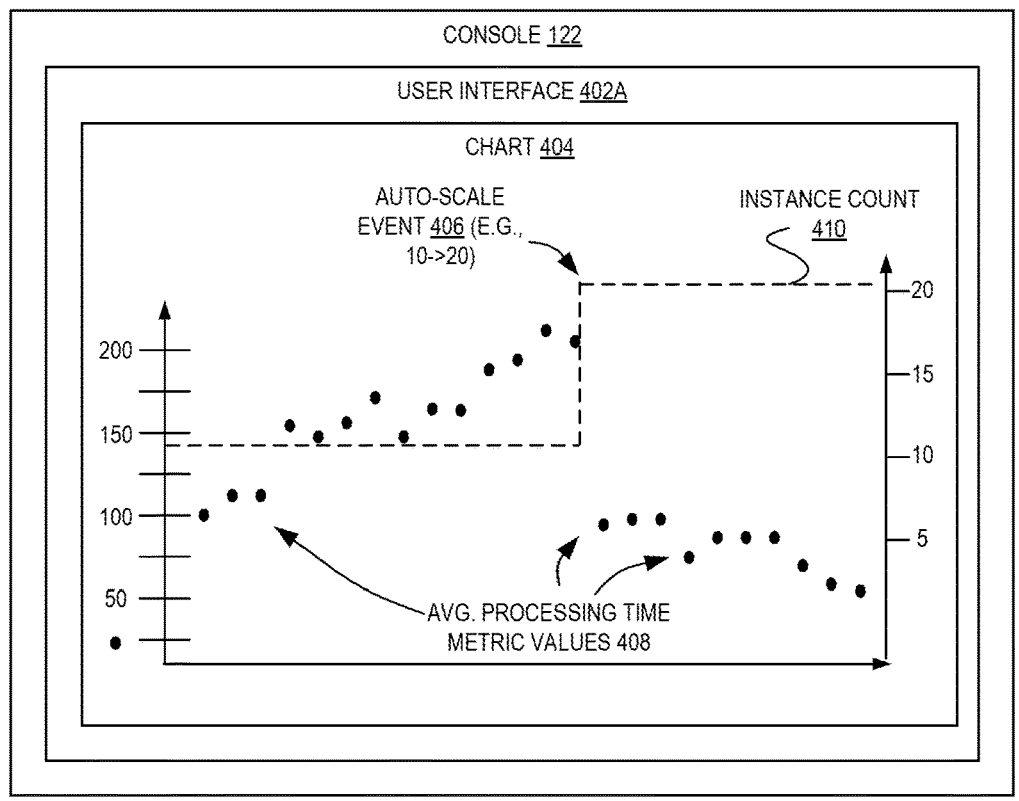
FIG. 4 is a diagram illustrating a metric value chart depicting an auto-scaling event and a user interface for configuring the auto-scaling of a hosted machine learning model according to some embodiments.
Figure 4:
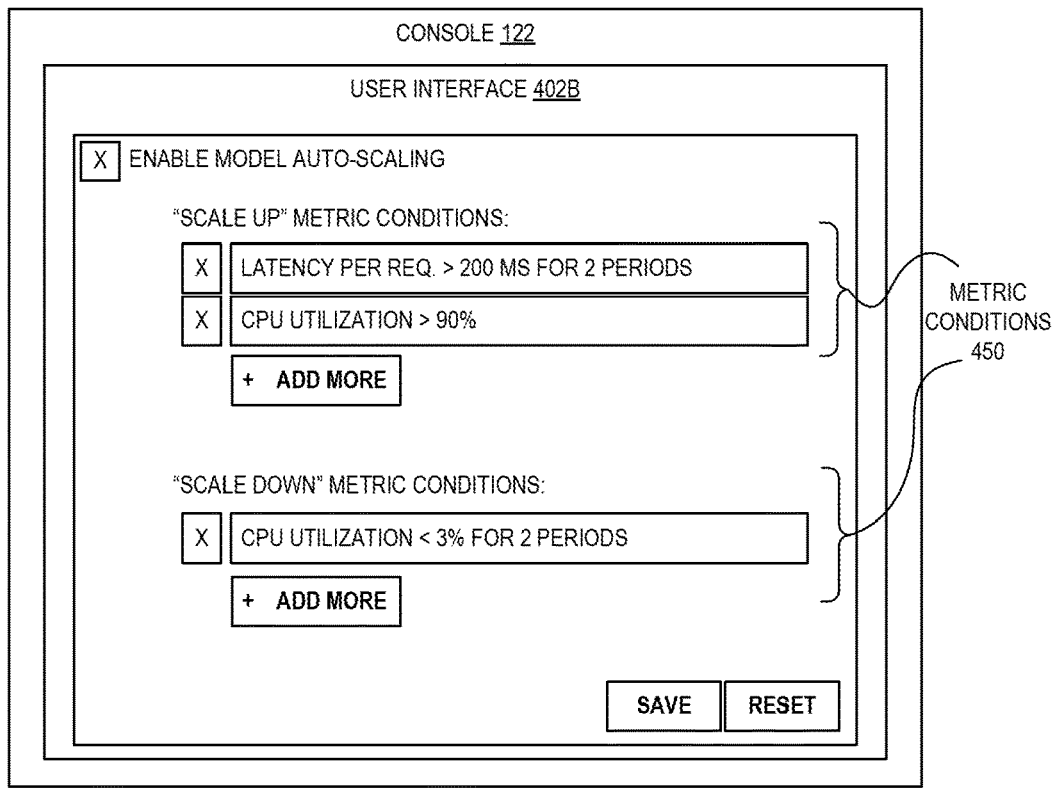

As shown in FIG. 4, two metric conditions are satisfied that indicate a user's desire for additional resources (e.g., model instances 118A-118N) to be added to the fleet. A first metric condition indicates that when latency per request is greater than two-hundred (200) milliseconds for two periods of time (e.g., where each period of time can be defined differently in different environments, where a period size may be defined by the time between metric collection), the fleet is to be scaled up. A second metric condition indicates that when a CPU utilization is ever detected as being greater than ninety-percent (90%), the fleet is to be scaled up.

In this illustrated example, the user interface 402B also shows a "scale down" condition where, if CPU utilization is less than three percent (3%) for 2 consecutive periods of time, one or more model instances 118A-118N are to be removed from the fleet.

In some embodiments, the metric conditions 450 may further be associated with a (non-illustrated) scaling factor indicating how much (e.g., a percentage or multiple, a fixed amount, etc.) the fleet is to be scaled upon the corresponding metric condition or conditions being met. However, in some embodiments, the auto-scaling monitor 108 may simply scale up (or down) the fleet by one or more model instances at a time (which could be statically configured or dynamically configured based on some other information and/or events).

To assist in crafting metric conditions and otherwise managing and monitoring the fleet, in some embodiments the console 122 may provide a user interface 402A with data (e.g., a chart 404) describing recent operational metric values and/or numbers of model instances 118A-118N in the fleet over time. As shown, "average processing time per request" operational metric values 408 are shown as dots in a chart 404. In some embodiments, multiple types of operational metric values 408 can be shown, either one at a time or multiple at once, and possibly using other visualization types or representations (e.g., a spreadsheet or list of values).

The exemplary chart 404 also represents numbers of model instances 118A-118N in the fleet over time (i.e., instance count 410) using a dashed line, where a first portion of the dashed line on the left indicates that ten instances are in the fleet, and then a second portion of the dashed line on the right indicates that twenty instances are in the fleet. In this case, the represented chart 404 includes an auto-scaling event 406. The auto-scaling event 406 corresponds to the first metric condition 450 shown in user interface 402B, in that the average processing time per request was greater than two-hundred milliseconds (200 ms) for 2 periods, and as a result, the fleet of model instances 118A-118N was scaled up from ten instances to twenty instances.

Returning to FIG. 1, a user 132 via an electronic device 130 may at circle '1' utilize a console 122 to configure auto-scaling for a fleet of model instances (e.g., using one or more user interfaces 402A-402B), which may cause the user's electronic device 130 to issue one or more API calls at circle '2A' that are translated into messages at '2B' for the auto-scaling system 106 to configure auto-scaling according to the user's preferences, which may begin at circle '3'.

Such metric condition-based mechanisms beneficially react to existing conditions and improve the operational performance of the fleet. However, due to such mechanisms being "reactive", the system may need to essentially wait for some potentially-problematic condition to develop. Thus, it is possible that for a short amount of time there may some processing delays/issues for the model, as the fleet is likely under-provisioned. While many applications can avoid significant problems by carefully crafting metric conditions to control the resources of the fleet, in other applications such conditions cannot be easily crafted and/or any processing delays may not be tolerable.

Accordingly, some embodiments can alternatively or additionally implement predictive auto-scaling. By analyzing at historical trends (e.g., using forecasting or machine learning techniques) embodiments can predict spikes or dips in traffic before they occur, and add or remove capacity ahead of time to provide a much smoother transition to an upcoming spike (or lull).

As one example, a video application may have large traffic spikes around the early evening hours of the day, which may happen every night during the week or workweek (e.g., Monday-Friday) due to people wishing to view video or otherwise use the video application in the evening before bedtime. Accordingly, embodiments can analyze a historical record of traffic for the application to detect a recurring traffic spike (e.g., at 8 pm) and react accordingly, for example, by scaling up the fleet (and/or a warm pool, as described later herein) before the predicted traffic spike (e.g., at 7:55 pm) with additional capacity/resources.

To this end, in FIG. 1, a predictive auto-scaling analysis engine ("PAAE") 112 of the auto-scaling system 106 can construct a predictive auto-scaling ("PA") model 113 based on operational metrics/characteristics of the model fleet 116 and use the PA model 113 to predict spikes and/or dips of traffic/load. As a result, the PAAE 112 can cause the auto-scaling engine 114 to scale up or down the fleet accordingly.

Figure 5:
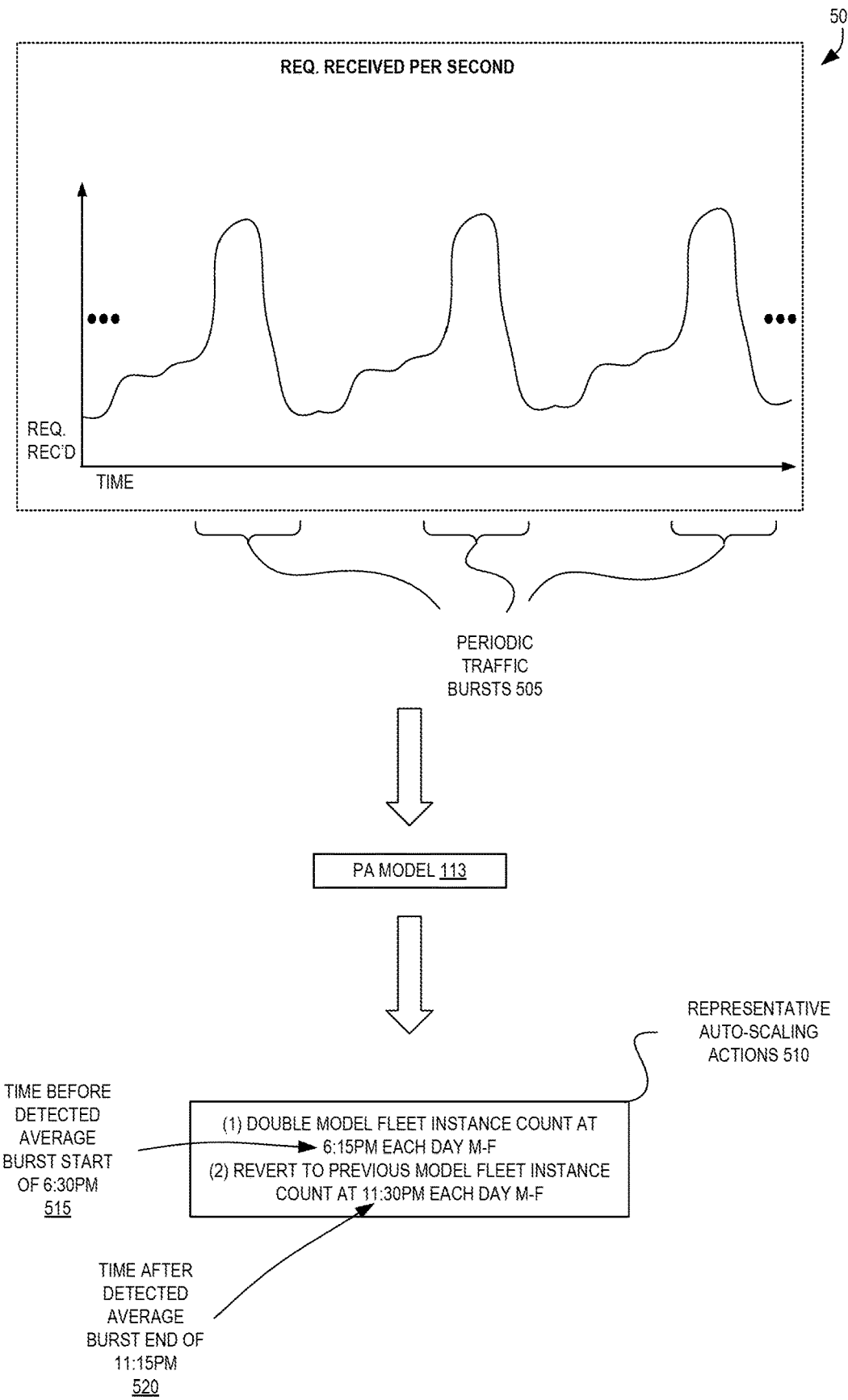
FIG. 5 is a diagram illustrating a visual representation of a predictive auto-scaling model that can be used for generating a predictive auto-scaling policy for auto-scaling hosted machine learning models for production inference according to some embodiments.

For example, we turn ahead to FIG. 5, which is a diagram illustrating a visual representation 500 of operational metric values that may be incorporated into a PA model 113 that can be used for generating a predictive auto-scaling policy 510 for auto-scaling hosted machine learning models for production inference according to some embodiments. The PA model 113 may take a variety of forms, such as a forecasting model or a machine learning model.

The illustrated representation 500 of operational metrics is a graph showing a number of requests per second over a period of time. Within this graph, multiple periodic bursts 505 are illustrated as existing—e.g., repeated spikes of model use between 6:30 pm every night and ending at 11:15 pm. Such bursts can be detected and incorporated into the model 113, which can be used to control how auto-scaling is to be performed.

As one example, using the PA model 113, the periodic traffic bursts 505 can be identified and as a result, auto-scaling can be performed before the predicted traffic bursts 505 occur to allow the model to accommodate the burst with ease. Thus, in one case, some representative auto-scaling actions 510 could be performed, such as doubling the model fleet instance count at 6:15 pm each day (which is a time 515 before the predicted burst of 6:30 pm), and/or a reverting back to a previous model fleet instance count at 11:30 pm each day (which is a time 520 after the end of the predicted burst of 11:15 pm).

With such predictive techniques, embodiments can smooth the operations of a fleet before a burst of traffic arrives. However, it is still possible that unexpected bursts or lulls could occur, and thus, some embodiments use both predicative techniques (of the PAAE 112) and the reactive techniques (of the auto-scaling monitor 108) to react to any unexpected bursts or lulls, resulting in extremely efficient operation for the fleet.

Figure 2:
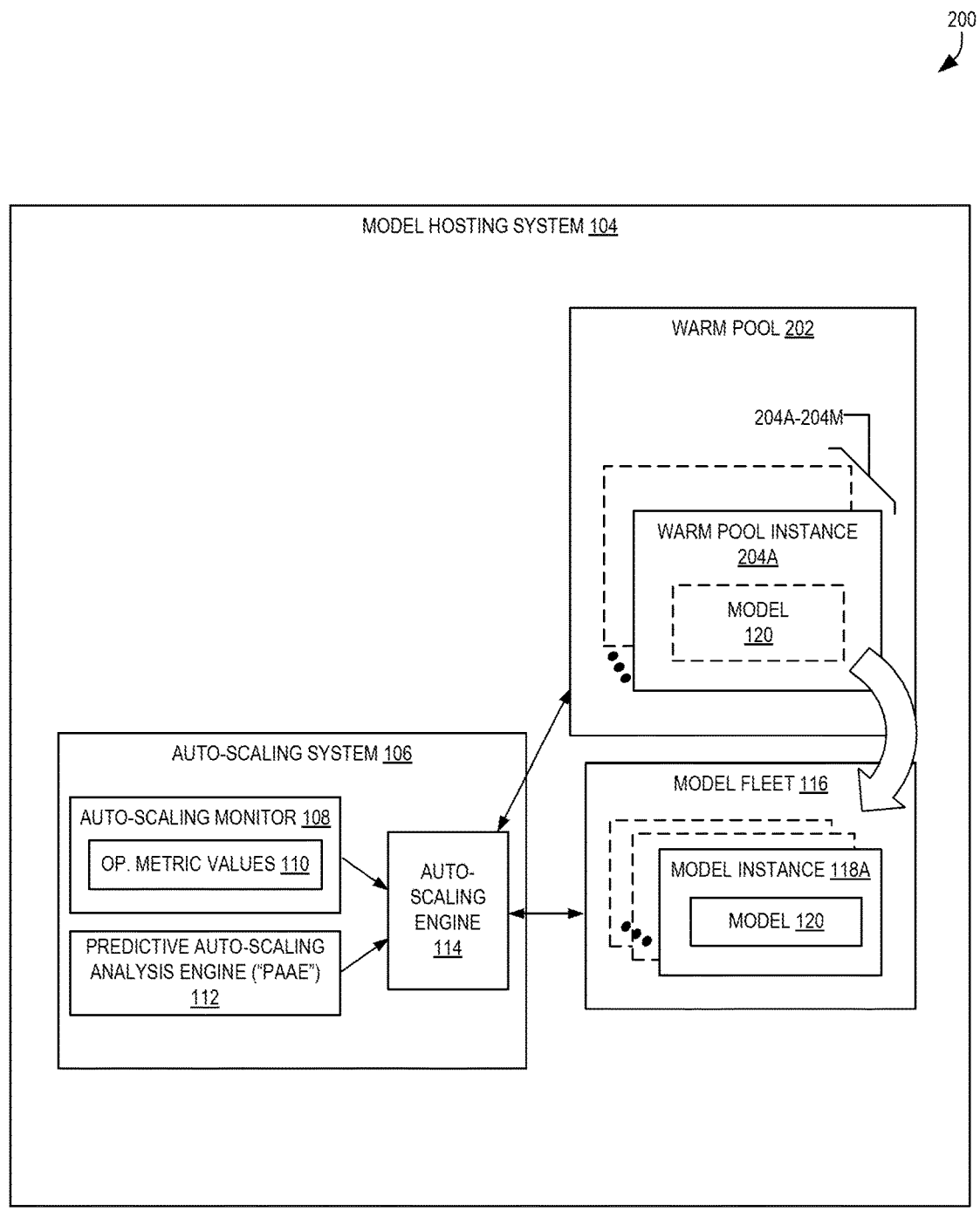
FIG. 2 is a block diagram illustrating the use of a warm pool of model instances for auto-scaling hosted machine learning models for production inference according to some embodiments.

Turning back to FIG. 2, embodiments can further ease the addition of additional model instances to a fleet using warm pooling. FIG. 2 is a block diagram illustrating the use of a warm pool 202 of instances 204A-204M for auto-scaling hosted machine learning models for production inference according to some embodiments. In some embodiments, instead of (or in addition to) adding additional model instances to a fleet 116 before a predicted burst, the auto-scaling engine 114 may create a warm pool 202 of instances 204A-204M. This can include instantiating virtual machines, loading these virtual machines with proper software (and possibly the model 102), configuring architectural supporting structures for the virtual machines (e.g., networking), etc., so that these warm pool instances 204A are available to be added to an existing fleet 116 extremely quickly, as opposed to needing to perform these "warming" tasks on-the-fly while a possible performance issue exists, thus reducing an amount of pain or difficulty the fleet may experience during a burst scenario.

Thus, in some embodiments, the PAAE 112 may predict bursts and create a warm pool 202 of instances 204A-204M, and thereafter when the auto-scaling monitor 108 uses its configured metric conditions to detect an issue, it can quickly move one or more warm pool instances 204A-204M into active service within the model fleet 116 to assist with a burst.

Figure 6:
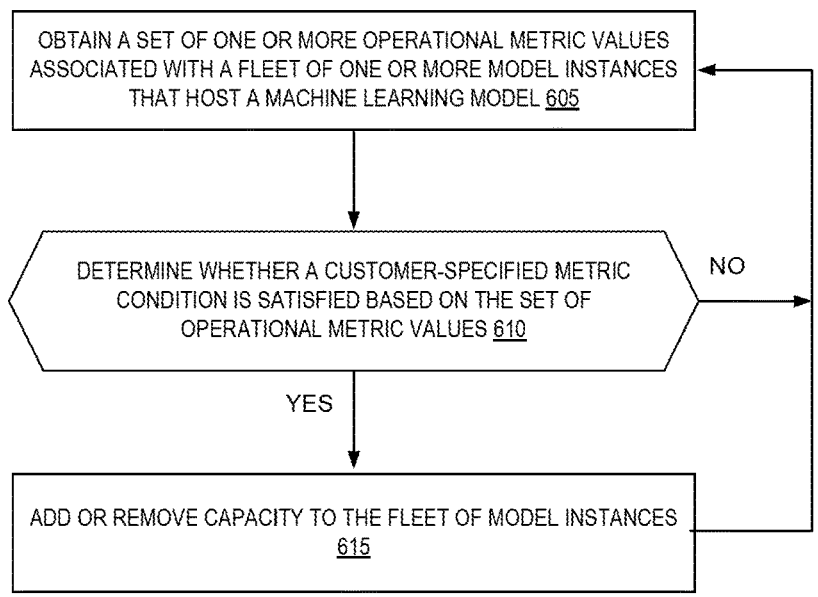
FIG. 6 is a flow diagram illustrating exemplary operations for reactive auto-scaling of hosted machine learning models for production inference according to some embodiments.

For further detail, FIG. 6 is a flow diagram illustrating exemplary operations 600 for reactive auto-scaling of hosted machine learning models for production inference according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the auto-scaling system 106 of the other figures.

The operations 600 include, at block 605, obtaining a set of one or more operational metric values associated with a fleet of one or more model instances that host a machine learning model. The machine learning model can be based on any of a variety of types of machine learning algorithms, including but not limited to a Linear Regression, Logistic Regression, Decision Tree, Support Vector Machine (SVM), Naive Bayes, K-nearest neighbor, K-Means, Random Forest, Dimensionality Reduction Algorithm, Gradient Boosting algorithm, neural network such as a recurrent neural network (RNN) or convolutional neural network (CNN), etc. The one or more model instances may comprise a container including logic created by a user, and may further comprise a virtual machine that executes the container. The fleet of model instances may operate behind one or more endpoints, and thus API calls may be to those endpoints to execute (or apply) the model against input data, and a response may be sent thereto including results from the model. The one or more operational metric values may include any of input/output metrics, latency metrics, reliability metrics, and/or utilization metrics.

The operations 600 also include, at block 610, determining whether a customer-specified metric condition is satisfied based on the set of operational metric values. A customer (or user) may specify a metric condition using a console. The condition may indicate at least one operational metric, and may further indicate a threshold value and a comparison operator (e.g., greater than, less than, equals). The condition can be evaluated through use of a current or recent operational metric value monitored in block 605. Block 610 can be performed periodically (e.g., according to a schedule), or can be performed when an operational metric value of the condition is detected as having changed (via block 605).

The operations 600 include, at block 615, adding or removing capacity to the fleet of model instances. In some embodiments, adding capacity includes moving an instance from a warm pool into the fleet. In some embodiments, adding capacity includes instantiating another one or more model instances—e.g., launching one or more VMs, configuring the VMs, provisioning the model to the VMs, etc. Removing capacity, in some embodiments, includes shutting down (or otherwise terminating) one or more model instances. The amount of capacity to be added or removed may be determined based on an indicator of the customer-specified metric condition, or could be based on a statically-configured increment amount, etc.

Figure 7:
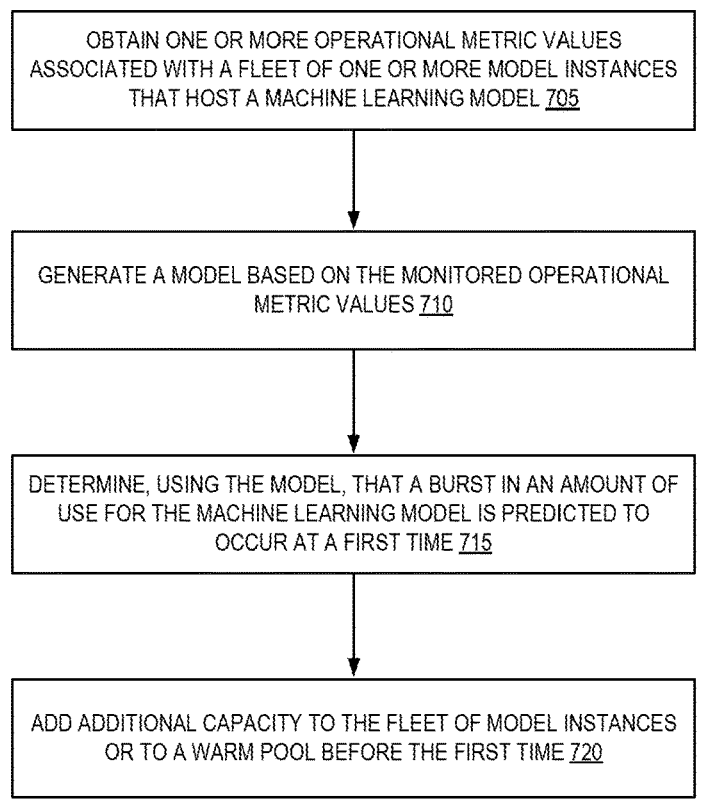
FIG. 7 is a flow diagram illustrating exemplary operations for predictive auto-scaling of hosted machine learning models for production inference according to some embodiments.

FIG. 7 is a flow diagram illustrating exemplary operations for predictive auto-scaling of hosted machine learning models for production inference according to some embodiments. In some embodiments, one or more (or all) of the operations 700 are performed by the auto-scaling system 106 of the other figures.

The operations 700 include, at block 705, obtaining (or monitoring) one or more operational metric values associated with a fleet of one or more model instances that host a machine learning model. The machine learning model can be based on any of a variety of types of machine learning algorithms, including but not limited to a Linear Regression, Logistic Regression, Decision Tree, Support Vector Machine (SVM), Naive Bayes, K-nearest neighbor, K-Means, Random Forest, Dimensionality Reduction Algorithm, Gradient Boosting algorithm, neural network such as a recurrent neural network (RNN) or convolutional neural network (CNN), etc. The one or more model instances may comprise a container including logic created by a user, and may further comprise a virtual machine that executes the container. The fleet of model instances may operate behind one or more endpoints, and thus API calls may be to those endpoints to execute (or apply) the model against input data, and a response may be sent thereto including results from the model. The one or more operational metric values may include any of input/output metrics, latency metrics, reliability metrics, and/or utilization metrics.

At block 710, the operations 700 include generating a model based on the monitored operational metric values. The generation can include applying forecasting or machine learning techniques to a set of historical operational metric data associated with the fleet of model instances to generate the model. In some embodiments, the model can predict spikes or dips in traffic, e.g., due to comparing current operational metric data (or the current day and/or time) with detected patterns in the historic operational metric data.

The operations 700 also include, at block 715, determining, using the model, that a burst in an amount of use for the machine learning model is predicted to occur at a first time. The determination can include inputting recent or current operational metric data to the model and analyzing a result. The result may be a numeric value, which could indicate a level of anticipated traffic, processing time, resource utilization, etc., involving the fleet at a future time.

The operations 700 also include, at block 720, adding additional capacity to the fleet of model instances or to a warm pool before the first time occurs. In some embodiments, adding capacity to the fleet includes moving an instance from a warm pool into the fleet. In some embodiments, adding capacity includes instantiating another one or more model instances—e.g., launching one or more VMs, configuring the VMs, and possibly provisioning the model to the VMs, etc.—to the warm pool or to the fleet.

Figure 8:
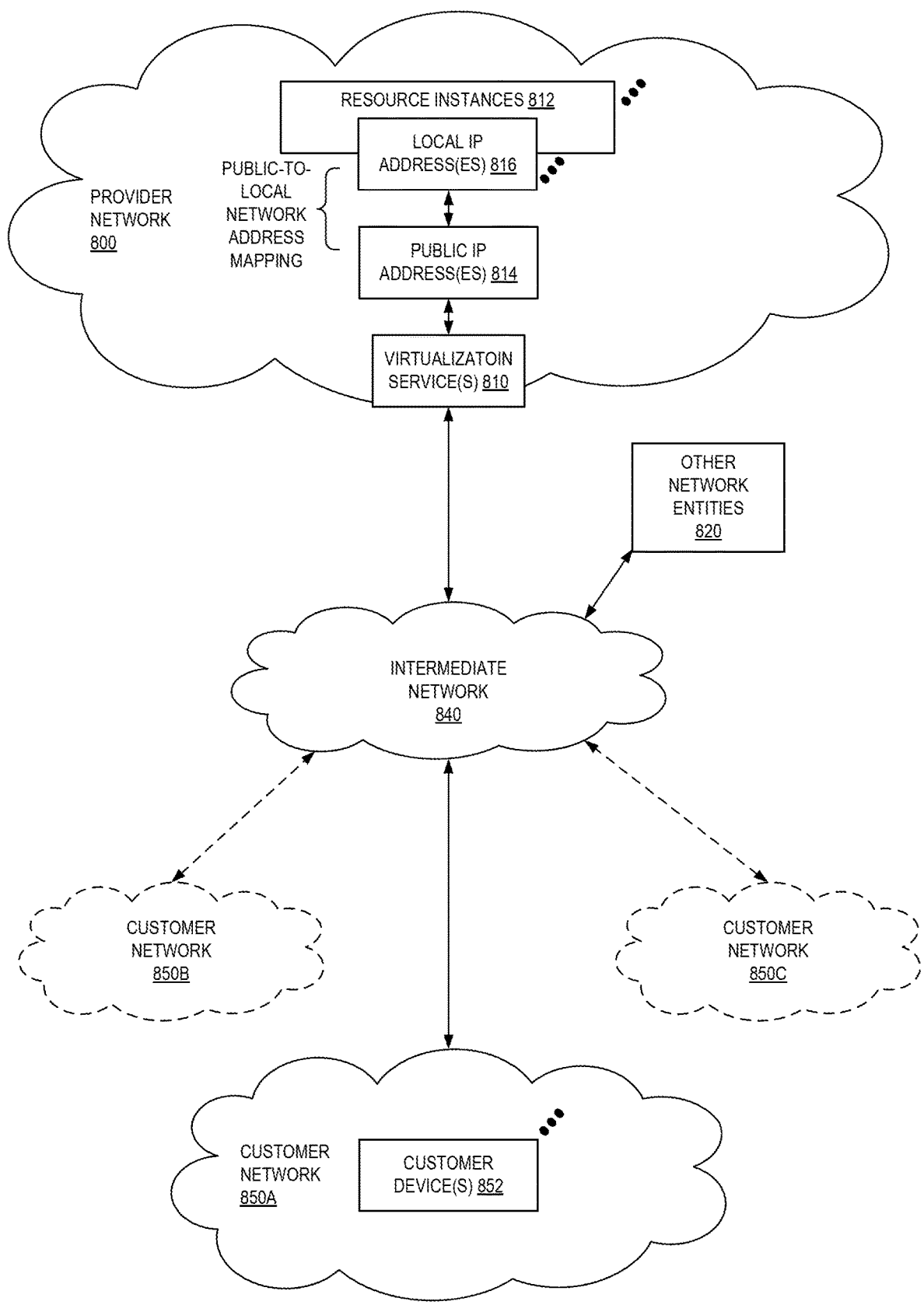
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
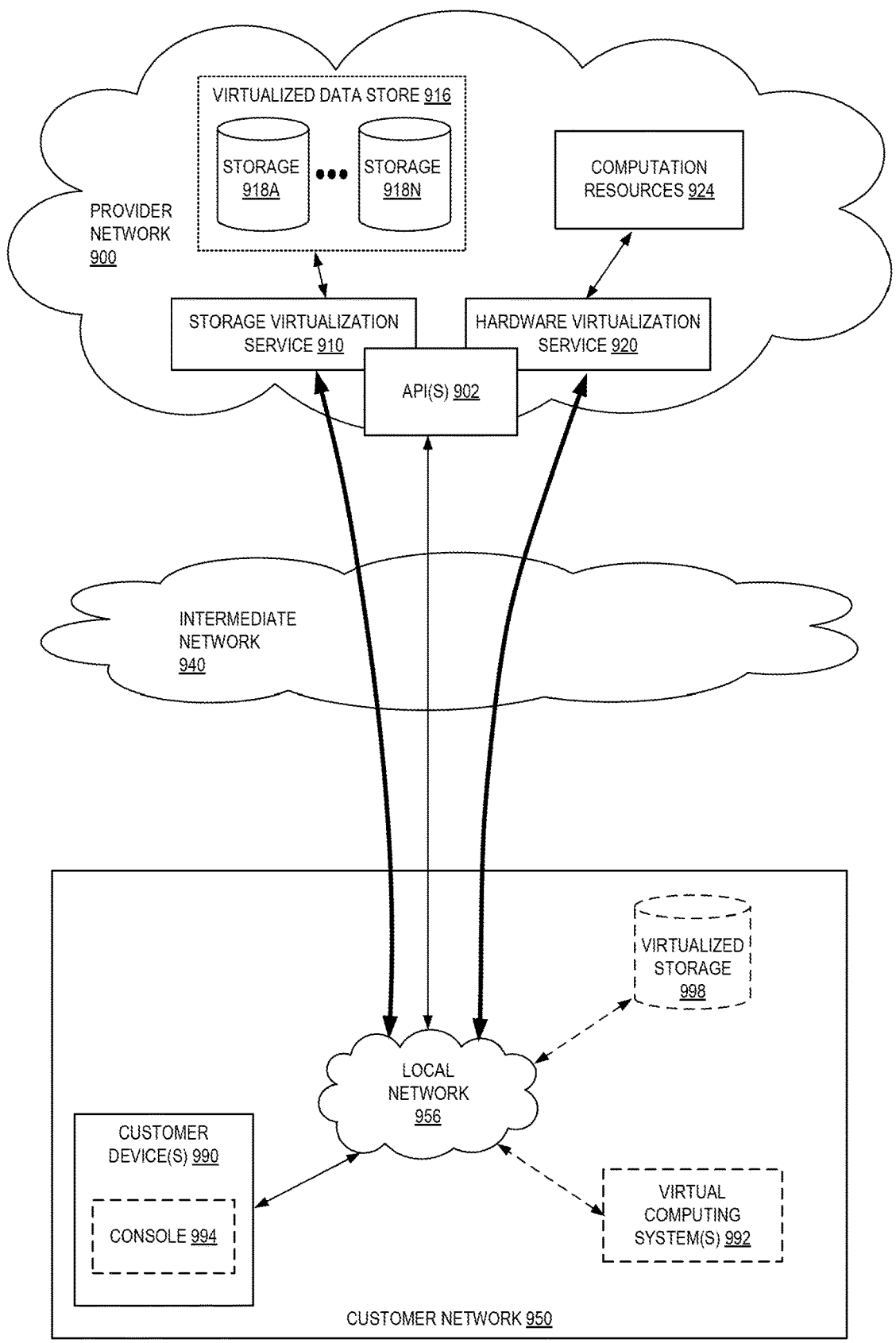
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 910, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative System

Figure 10:
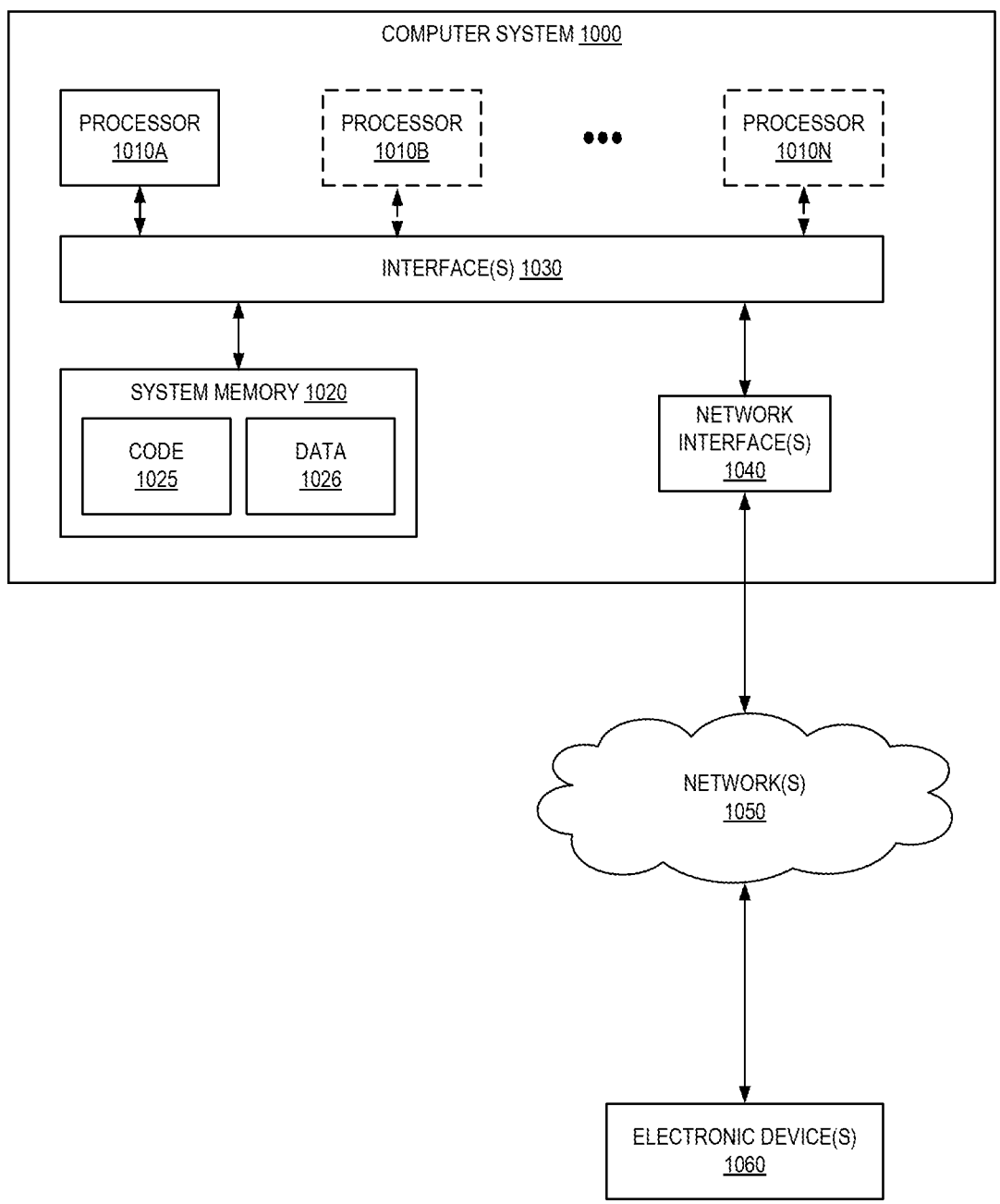
FIG. 10 is a block diagram illustrating an example computer system that may be used in some embodiments.

In some embodiments, a system that implements a portion or all of the techniques for auto-scaling hosted machine learning models for production inference as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 1020 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 118A-118N, 204A-204M) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:
1. A computer-implemented method comprising:
   training a predictive machine learning model based on historical operational metric data obtained from model instances hosting machine learning models in a provider network;

determining, based on use of the predictive machine learning model, that a predicted increase utilization of machine learning models deployed in the provider network will occur;

adding at least a model instance to a warm pool, the warm pool including model instances at least partially configured for use in hosting machine learning models but not yet actively used for hosting machine learning models;

receiving, at an endpoint of the provider network, a request to enable an automatic scaling of an amount of model instances within a fleet, the fleet including one or more model instances in the provider network that host a machine learning model;

receiving a metric condition, specified by a user associated with the machine learning model, that is based on an operational metric associated with the fleet and indicates when the automatic scaling is to occur;

monitoring operational metrics associated with the fleet;

determining, based on the monitoring operational metrics associated with the fleet, that the metric condition is satisfied;

performing the automatic scaling of the fleet, comprising fully-configuring the model instance to host the machine learning model and adding, from the warm pool, the model instance to the fleet; and utilizing the model instance to service an inference request.

2. The computer-implemented method of claim 1, wherein the operational metric is one of:

an input or output metric indicating an amount of requests received for the machine learning model or an amount of responses sent by the machine learning model over a period of time; or a latency metric indicating an amount of processing time per request received for the machine learning model over the period of time.

3. The computer-implemented method of claim 1, further comprising:

generating the machine learning model based on one or more historic operational metrics associated with the fleet.

4. A computer-implemented method comprising:

determining, based on use of a computer-implemented model, that a predicted increase in a utilization of machine learning models deployed in a provider network will occur;

adding at least a model instance to a warm pool, the warm pool including one or more model instances at least partially configured for use in hosting machine learning models but not yet actively used for hosting machine learning models;

receiving a metric condition, specified by a user, that indicates when automatic scaling of a machine learning model is to occur based on a user-specified operational metric associated with a fleet, the fleet including one or more model instances executing in the provider network that implement the machine learning model, the metric condition identifying a user-specified threshold value associated with the operational metric;

monitoring operational metrics, including the operational metric, associated with the fleet;

determining, based on the monitoring of operational metrics associated with the fleet, that the metric condition is satisfied;

adding the model instance to the fleet from the warm pool; and utilizing the model instance to service an inference request.

5. The computer-implemented method of claim 4, wherein the operational metric is one of:

an input or output metric indicating an amount of requests received for the machine learning model or an amount of responses sent by the machine learning model over a period of time; or a latency metric indicating an amount of processing time per request received for the machine learning model over the period of time.

6. The computer-implemented method of claim 4, further comprising:

transmitting, to an electronic device of the user, data for a user interface to be presented to the user, wherein the user interface includes a chart that illustrates a plurality of values of the operational metric over time.

7. The computer-implemented method of claim 6, wherein the user interface further indicates numbers of model instances in the fleet over time.

8. The computer-implemented method of claim 4, further comprising:

generating the machine learning model based on one or more historic operational metric values associated with the fleet.

9. The computer-implemented method of claim 8, wherein the adding of the model instance to the warm pool occurs responsive to the determining that the predicted increase in the utilization of machine learning models deployed in the provider network will occur.

10. The computer-implemented method of claim 4, wherein adding the model instance to the fleet from the warm pool comprises transmitting an Application Programming Interface (API) request message to an endpoint of the provider network.

11. The computer-implemented method of claim 4, wherein the model instance comprises a container including user-provided model code, wherein the container executes upon a virtual machine.

12. The computer-implemented method of claim 4, wherein the metric condition is associated with a scaling factor indicating how much to automatically scale the fleet when the metric condition is met.

13. The computer-implemented method of claim 12, further comprising:

determining, responsive to the determining that the metric condition is satisfied, a number of metric instances to add to the fleet based on the scaling factor, wherein the number of metric instances to add is greater than one; and adding, in addition to the model instance, one or more other model instances to the fleet from the warm pool.

14. A system comprising:

a first one or more electronic devices of a provider network to execute a fleet, the fleet including one or more model instances that implement a machine learning model and to implement a warm pool, the warm pool including model instances at least partially configured for use in hosting machine learning models but not yet actively used for hosting machine learning models; and a second one or more electronic devices to implement an auto-scaling system of the provider network, wherein the auto-scaling system includes instructions which, when executed by the second one or more electronic devices, cause the auto-scaling system to:

determine, based on a computer-implemented model, that a predicted increase in a utilization of machine learning models deployed in the provider network will occur;

cause at least a model instance to be added to the warm pool;

receive a metric condition, specified by a user, that indicates when automatic scaling of a machine learning model is to occur based on a user-specified operational metric associated with the fleet, the metric condition identifying a user-specified threshold value associated with the operational metric;

monitor operational metrics, including the operational metric, associated with the fleet;

determine, based on the monitoring of operational metrics associated with the fleet, that the metric condition is satisfied;

cause the model instance to be added to the fleet from the warm pool, wherein the model instance is used to service inference requests involving the machine learning model.

15. The system of claim 14, wherein the operational metric is one of:

an input or output metric indicating an amount of requests received for the machine learning model or an amount of responses sent by the machine learning model over a period of time; or a latency metric indicating an amount of processing time per request received for the machine learning model over the period of time.

16. The system of claim 15, wherein the system further comprises a console implemented by a third one or more electronic devices that is to:

transmit, to an electronic device of the user, data for a user interface to be presented to the user, wherein the user interface includes a chart that illustrates a plurality of values of the operational metric over time.

17. The system of claim 16, wherein the user interface further indicates numbers of model instances in the fleet over time.

18. The system of claim 14, wherein the instructions, when executed by the second one or more electronic devices, further cause the auto-scaling system to:

generate the machine learning model based on one or more historic operational metric values associated with the fleet.

19. The system of claim 18, wherein the addition of the model instance to the warm pool occurs responsive to the determination that the predicted increase in the utilization of machine learning models deployed in the provider network will occur.

20. The system of claim 14, wherein the model instance comprises a container including user-provided model code, wherein the container executes upon a virtual machine.

* * * * *